US011590980B2

(12) United States Patent
Dingli et al.

(10) Patent No.: US 11,590,980 B2
(45) Date of Patent: Feb. 28, 2023

(54) AUTOMATED RESPONSES TO VEHICLE TRUNK ENTRAPMENT

(71) Applicant: Pony AI Inc., Grand Cayman (KY)

(72) Inventors: Robert Dingli, Cupertino, CA (US); Peter G. Diehl, Shanghai (CN)

(73) Assignee: Pony AI Inc., Grand Cayman (KY)

( * ) Notice: Subject to any disclaimer, the term of this patent is extended or adjusted under 35 U.S.C. 154(b) by 277 days.

(21) Appl. No.: 16/882,251

(22) Filed: May 22, 2020

(65) Prior Publication Data

US 2021/0362726 A1 Nov. 25, 2021

(51) Int. Cl.
*B60W 40/08* (2012.01)
*B60W 50/00* (2006.01)
*B60W 50/14* (2020.01)
*G06V 20/59* (2022.01)
*G06V 20/64* (2022.01)

(52) U.S. Cl.
CPC ........ *B60W 40/08* (2013.01); *B60W 50/0098* (2013.01); *B60W 50/14* (2013.01); *G06V 20/59* (2022.01); *G06V 20/64* (2022.01); *B60W 2040/0881* (2013.01)

(58) Field of Classification Search
CPC ............. B60W 40/08; B60W 50/0098; B60W 50/14; B60W 2040/0881; G06V 20/59; G06V 20/64
See application file for complete search history.

(56) References Cited

U.S. PATENT DOCUMENTS

| 6,335,687 | B1 * | 1/2002 | Terashima | E05B 83/26 340/425.5 |
| 8,818,621 | B2 * | 8/2014 | Taki | B60R 25/2036 701/49 |
| 10,964,215 | B1 * | 3/2021 | Papineau | G08G 1/146 |
| 2002/0080014 | A1 * | 6/2002 | McCarthy | H03K 17/955 340/561 |
| 2003/0102688 | A1 * | 6/2003 | Bingle | G08B 21/22 296/76 |
| 2007/0025597 | A1 * | 2/2007 | Breed | B60N 2/002 382/104 |
| 2007/0086624 | A1 * | 4/2007 | Breed | B60R 21/01552 382/104 |
| 2008/0021616 | A1 * | 1/2008 | Aoki | B60R 21/01538 701/45 |
| 2016/0176265 | A1 * | 6/2016 | Rolka | B60H 1/00742 701/45 |
| 2017/0028811 | A1 * | 2/2017 | Jayasundera | A61B 5/6893 |
| 2018/0086307 | A1 * | 3/2018 | Spina | G06T 7/11 |
| 2020/0193196 | A1 * | 6/2020 | Saydag | G06Q 10/087 |
| 2020/0250445 | A1 * | 8/2020 | Papineau | G01S 5/0027 |
| 2020/0292686 | A1 * | 9/2020 | Murata | G01S 13/42 |
| 2021/0107421 | A1 * | 4/2021 | Uno | B60W 40/08 |

(Continued)

*Primary Examiner* — Yazan A Soofi
*Assistant Examiner* — Naeem Taslim Alam

(57) ABSTRACT

Described herein are systems, methods, and computer readable media for capturing sensor data relating to an enclosed compartment of a vehicle (e.g., a cargo area of the vehicle) via one or more vehicle sensors; analyzing the sensor data to determine whether it is indicative of a living being present in the enclosed compartment; performing an object detection analysis on at least a portion of the sensor data to determine a type of living being detected; and initiating one or more automated vehicle response measures based on the type of living being.

20 Claims, 6 Drawing Sheets

(56) References Cited

U.S. PATENT DOCUMENTS

2021/0221400 A1* 7/2021 Yu ........................ B60W 50/14
2021/0342611 A1* 11/2021 Kale ....................... G06N 3/08
2021/0350688 A1* 11/2021 Ogawa .................. H04N 7/183

* cited by examiner

AUTOMATED RESPONSES TO VEHICLE TRUNK ENTRAPMENT

The present invention relates generally to sensing in-vehicle characteristics, and more particularly, in some embodiments, to utilizing vehicle cargo cameras and other sensors to detect and respond to characteristics and conditions present in an enclosed compartment of a vehicle such as a cargo area of an autonomous vehicle.

BACKGROUND

Autonomous vehicles, also referred to as driverless vehicles, are vehicles capable of making autonomous driving decisions without requiring human action or input. In general, autonomous vehicles include a variety of types of sensors that provide sensor data that is analyzed/processed/manipulated by software/firmware/hardware onboard the vehicle or executing in a remote environment to make autonomous driving decisions such as when and the extent to which to accelerate or decelerate; when and the extent to which to turn the vehicle (e.g., turning radius); when to brake the vehicle, the amount of braking force to apply, and what braking distance to maintain; and so forth.

In scenarios in which an autonomous vehicle is operating in the absence of a human driver capable of manually overriding operational control of the vehicle, various technical problems may arise relating to tasks or observations that would typically be performed by the human driver such as observations relating to in-vehicle conditions or characteristics. Discussed herein are technical solutions that address these and other technical drawbacks associated with autonomous vehicle operation.

SUMMARY

In an example embodiment, a computer-implemented method for detecting presence of a living being in an enclosed compartment of a vehicle is disclosed. The method includes capturing, via one or more sensors associated with the vehicle, sensor data relating to one or more sensed characteristics of the enclosed compartment of the vehicle and determining that the sensor data is indicative of the presence of the living being in the enclosed compartment of the vehicle. The method further includes performing an object detection analysis on image data included in the sensor data, determining a type of the living being based at least in part on the object detection analysis, and initiating one or more automated vehicle response measures based at least in part on the type of the living being.

In an example embodiment, determining the type of the living being includes determining that the living being is a live animal based at least in part on the object detection analysis.

In an example embodiment, the method further includes applying a trained machine learning model to the image data to determine a type of the live animal.

In an example embodiment, the sensor data is first sensor data, and the method further includes determining a range of acceptable values of a health parameter related to the type of the live animal, capturing, via the one or more sensors, second sensor data including measured values of the health parameter, and determining whether the measured values of the health parameter are within the range of acceptable values. In an example embodiment, initiating the one or more automated vehicle response measures includes initiating the one or more automated vehicle response measures further based at least in part on whether the measured values of the health parameter are within the range of acceptable values.

In an example embodiment, determining whether the measured values of the health parameter are within the range of acceptable values includes determining that each of a threshold number of the measured values of the health parameter is within the range of acceptable values for at least a threshold period of time. In an example embodiment, assuming, for example, that it is determined that each of a threshold number of the measured values of the health parameter is within the range of acceptable values for at least a threshold period of time, initiating the one or more automated vehicle response measures includes performing additional monitoring of the enclosed compartment of the vehicle to capture additional sensor data including additional measured values of the health parameter.

In an example embodiment, determining whether the measured values of the health parameter are within the range of acceptable values includes determining that at least a threshold number of the measured values of the health parameter are outside of the range of acceptable values for at least a threshold period of time. In an example embodiment, assuming, for example, that it is determined that at least a threshold number of the measured values of the health parameter are outside of the range of acceptable values for at least a threshold period of time, initiating the one or more automated vehicle response measures includes at least one of: i) sending an emergency alert message to one or more emergency service providers, ii) presenting a visual or audible alert to an occupant of the vehicle, or iii) automatically releasing a locking mechanism of the enclosed compartment when the vehicle is not moving.

In an example embodiment, the sensor data is first sensor data, determining the type of the living being based at least in part on the object detection analysis includes determining that the living being is a human, and the method further includes determining, based at least in part on the first sensor data, one or more physical characteristics of the human, determining a range of acceptable values for a health parameter based at least in part on the one or more physical characteristics of the human, capturing, via the one or more sensors, second sensor data including measured values of the health parameter, and comparing the measured values of the health parameter to the range of acceptable values for the health parameter to obtain a set of one or more comparison results. In an example embodiment, the method further includes capturing, via the one or more sensors, third sensor data indicative of one or more environmental characteristics of at least one of an interior or surrounding exterior area of the vehicle and analyzing the third sensor data to generate a set of one or more analysis results. In an example embodiment, initiating the one or more automated vehicle response measures includes initiating the one or more automated vehicle response measures further based at least in part on the set of one or more comparison results and the set of one or more analysis results.

In an example embodiment, comparing the measured values of the health parameter to the range of acceptable values for the health parameter includes determining that at least a threshold number of the measured values are within the range of acceptable values for at least a threshold period of time, analyzing the third sensor data includes determining that the third sensor data is indicative of a potentially dangerous condition present in at least one of the interior or the surrounding exterior area of the vehicle, and initiating the one or more automated vehicle response measures includes at least one of: i) performing additional monitoring of the enclosed compartment of the vehicle to capture first additional sensor data including additional measured values of the health parameter, ii) performing additional monitoring of at least one of the interior or the surrounding exterior area of the vehicle to capture second additional sensor data indicative of the one or more environmental characteristics, or iii) sending a silent alert to one or more emergency service providers.

In an example embodiment, a system for detecting presence of a living being in an enclosed compartment of a vehicle is disclosed. The system includes at least one processor and at least one memory storing computer-executable instructions. The at least one processor is configured to access the at least one memory and execute the computer-executable instructions to perform a set of operations including capturing, via one or more sensors associated with the vehicle, sensor data relating to one or more sensed characteristics of the enclosed compartment of the vehicle and determining that the sensor data is indicative of the presence of the living being in the enclosed compartment of the vehicle. The set of operations further includes performing an object detection analysis on image data included in the sensor data, determining a type of the living being based at least in part on the object detection analysis, and initiating one or more automated vehicle response measures based at least in part on the type of the living being. The above-described system is further configured to perform any of the operations/functions and may include any of the additional features/aspects of example embodiments of the invention described above in relation to example computer-implemented methods of the invention.

In an example embodiment, a computer program product for detecting presence of a living being in an enclosed region of a vehicle is disclosed. The computer program product includes a non-transitory computer-readable medium readable by a processing circuit. The non-transitory computer-readable medium stores instructions executable by the processing circuit to cause a method to be performed. The method includes capturing, via one or more sensors associated with the vehicle, sensor data relating to one or more sensed characteristics of the enclosed compartment of the vehicle and determining that the sensor data is indicative of the presence of the living being in the enclosed compartment of the vehicle. The method further includes performing an object detection analysis on image data included in the sensor data, determining a type of the living being based at least in part on the object detection analysis, and initiating one or more automated vehicle response measures based at least in part on the type of the living being. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Overview

Figure 1:
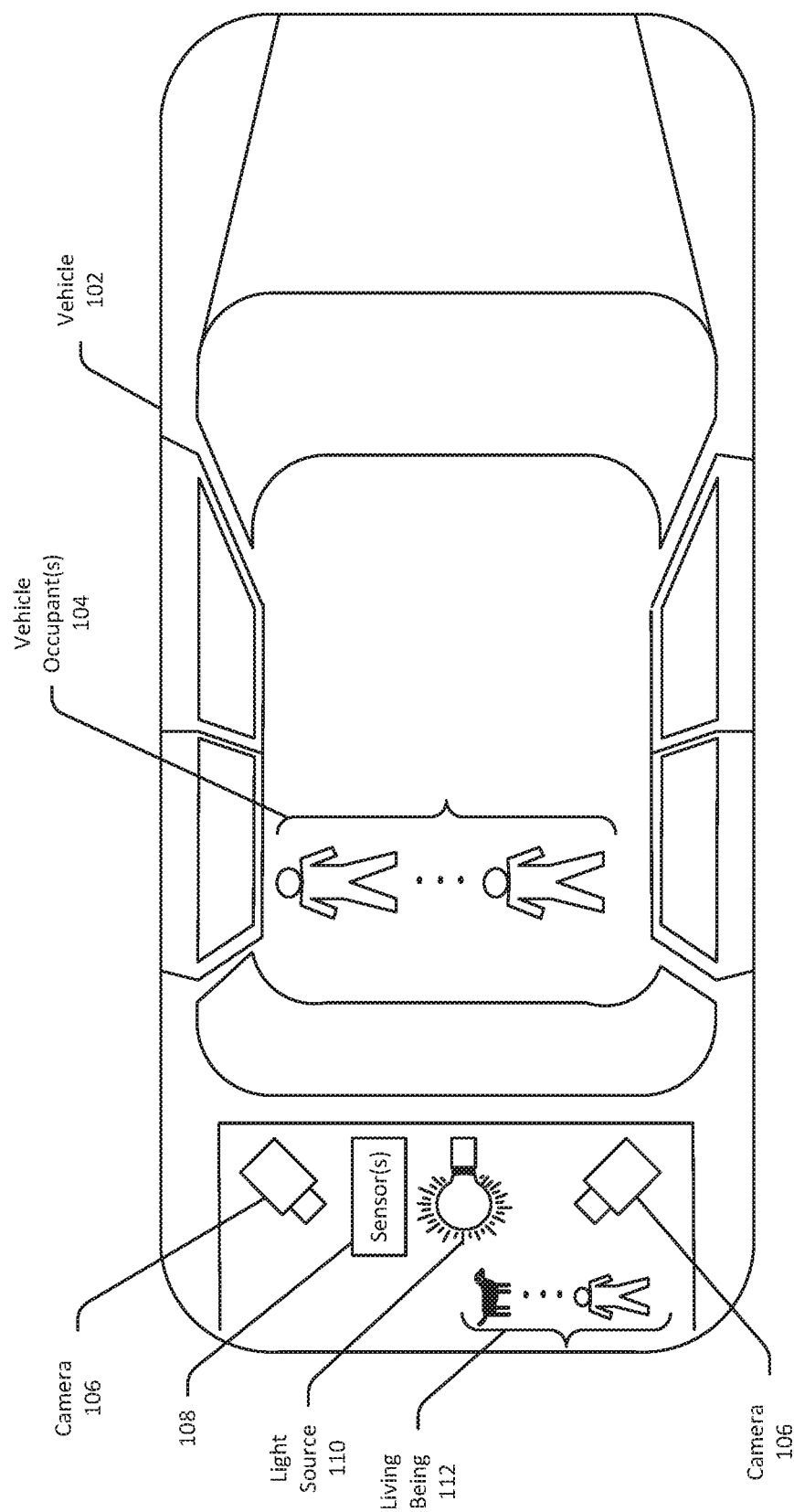
FIG. 1 illustrates an example configuration of cameras and other sensors for sensing characteristics of an enclosed compartment of a vehicle such as a cargo area in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the invention overcome technical problems specifically arising in the realm of computer-based technology, and more specifically, in the realm of autonomous vehicle technology. Autonomous vehicles are vehicles capable of making autonomous driving decisions without the aid of a human driver. In some cases, governmental regulations or the like may require that one or more humans be present in an autonomous vehicle during operation in order to potentially override autonomous operation of the vehicle if necessary to ensure vehicle occupant safety. In other cases, however, an autonomous vehicle may operate without the presence of any human capable of taking over manual control of the vehicle. For instance, an autonomous vehicle ride-sharing or taxi service may provide fully autonomous vehicles capable of transporting vehicle occupants (e.g., passengers) around without the aid of a human driver.

In example scenarios, the absence of a human driver may pose various technical problems relating to autonomous vehicle use. A human driver, particularly in connection with a taxi or ride-sharing service, may provide additional services for a passenger beyond merely operating the vehicle. These services may include, for example, assisting a passenger with placing items in or retrieving items from an enclosed compartment of the vehicle such as a cargo area of the vehicle; monitoring an interior or surrounding exterior environment of the vehicle for any potentially dangerous situations or conditions; and so forth. The absence of a human driver in some autonomous vehicle operational settings poses technical problems with respect to performing the above-mentioned tasks, for example.

Example embodiments of the invention described herein provide technical solutions that address at least the aforementioned technical problems associated with the absence of a human driver in certain autonomous vehicle operational contexts. In particular, example embodiments of the invention relate to computer-implemented methods, systems, computer program products, techniques, and methodologies for capturing sensor data relating to an enclosed compartment of a vehicle (e.g., a cargo area of the vehicle) via one or more vehicle sensors; analyzing the sensor data to determine whether it is indicative of a living being present in the enclosed compartment; performing an object detection analysis on at least a portion of the sensor data to determine a type of living being detected; and initiating one or more automated vehicle response measures based on the type of living being.

In example embodiments, a variety of different types of sensors may be provided inside and/or on an exterior of an autonomous vehicle. Such on-board vehicle sensors may include, without limitation, Light Detecting and Ranging (LiDAR) sensors, radars, cameras, Global Positioning System (GPS) receivers, sonar-based sensors, ultrasonic sensors, microphones, inertial measurement units (IMUs), accelerometers, gyroscopes, magnetometers, infrared (IR) sensors, and so forth. In example embodiments, sensors may be located within an enclosed compartment of a vehicle (e.g., a cargo area of the vehicle) to capture sensor data that may be indicative of the presence of a living being within the enclosed compartment. Such sensors may include, without limitation, one or more cameras configured to capture image data of the enclosed compartment; one or more IR sensors or the like configured to capture heat signature data that may be indicative of a living being in the enclosed compartment; one or more vibration sensors or other inertial sensors configured to capture movement/vibrational data that may be indicative of movement of a living being within the enclosed compartment; one or more gas sensors (e.g., oxygen sensors, carbon dioxide sensors, etc.) configured to detect the concentrations of various gases within the enclosed compartment; and so forth.

In some example embodiments, the image data may be analyzed first and an object detection analysis may be performed on the image data using, for example, a trained machine learning model (e.g., a trained supervised, semi-supervised, or unsupervised classifier) to determine whether a living being is detectable in the image data. In some example embodiments, additional types of sensor data (e.g., heat signature data, vibrational/movement data, gas sensor data, etc.) may be used to supplement the image data (or as an alternative to image data that has a poor quality/resolution) to detect the presence of a living being in the enclosed compartment.

In some example embodiments, a living being detected in the enclosed compartment of the vehicle may be an animal such as a pet that a passenger is transporting. In such example embodiments, a machine learning model/algorithm trained to distinguish between different types of animals, for example, may be executed on image data of the enclosed compartment (and optionally additional types of sensor data) to identify the type of animal. Ranges of acceptable (e.g. normal) values for one or more health parameters may then be determined for the type of animal that is detected. For example, ranges of acceptable heart rates, breathing rates, or the like—which may differ for different animals may be determined for the type of animal detected. Additional sensor data representing measured values for the various health-related parameters being evaluated may be captured and compared to the ranges of acceptable values to determine whether one or more automated vehicle response measures should be initiated.

In some example embodiments, a potentially dangerous high-risk situation for the animal (e.g., a serious health risk for the animal) may be identified if at least threshold number of the measured values for the health-related parameters fall outside corresponding acceptable ranges for at least a threshold period of time. In some example embodiments, at least a threshold number of the measured values may need to be more than a threshold amount outside of the acceptable range for at least a threshold period of time before a potentially dangerous situation is identified. In other example embodiments, other criteria may be evaluated or other conditions may need to be met before a potentially dangerous situation is identified. In any case, in example embodiments, if criteria indicative of a potentially dangerous situation are satisfied, one or more automated vehicle response measures may be initiated. Such measures may include, for example, sending an emergency alert message to one or more emergency service providers; presenting a visual or audible alert to an occupant of the vehicle; automatically releasing a locking mechanism of the enclosed compartment when the vehicle is not moving; or the like. In some example embodiments, if the criteria indicative of a potentially dangerous situation for the animal in the enclosed compartment is not satisfied, sensor data indicative of measured values for the health parameters may continue to be received and evaluated against the criteria periodically.

In some example embodiments, the living being detected in the enclosed compartment of the vehicle may be a human. For example, in some situations, an individual may be forced into the enclosed compartment against their will. In other example scenarios, an individual may voluntarily enter the enclosed compartment to, for example, evade capture or escape a dangerous situation or individual. In some example embodiments, the living being may be determined to be a human based on an object detection analysis performed on sensor data such as image data of the enclosed compartment. For instance, a trained machine learning model (e.g., a trained classifier) may receive the image data as input and provide an output indicative of whether a living being depicted in the image data is a human. In some example embodiments, additional types of sensor data (e.g., heat signature data, vibrational/movement data, gas sensor data, etc.) may additionally or alternatively be analyzed to determine whether a living being is present in the enclosed compartment, and if so, whether the living being is a human. For instance, particular heat signatures, vibrational characteristics, and/or gas concentration levels may be characteristic of a human.

In some example embodiments, captured sensor data may be evaluated to determine physical characteristics of a human present in the enclosed compartment of the vehicle. For instance, image data may be assessed to approximate size characteristics of the human such as height, weight, body frame, or the like. Other forms of sensor data such as heat signature data, gas concentration levels, or the like—which as noted earlier can be used to determine that a living being is a human—can also be used to identify specific characteristics of the human.

In some example embodiments, ranges of acceptable (e.g. normal) values for one or more health parameters may then be determined for the human based on the determined physical characteristics. For example, normal ranges for heart rate, breathing rate, or the like that are specific to a human having the identified physical characteristics may be determined. Additional sensor data representing measured values for the various health-related parameters being evaluated may be captured and compared to the ranges of acceptable (e.g., normal) values to generate a set of one or more comparison results. In addition, other sensor data indicative of environmental characteristics of an interior or surrounding exterior area of the vehicle may be captured and analyzed to generate a set of one or more analysis results.

Then, in some example embodiments, one or more automated vehicle response measures may be initiated based at least in part on the set of one or more comparison results and the set of one or more analysis results. In some example embodiments, the set of comparison results may be assessed to determine whether at least a threshold number of the measured values are within the range of acceptable values for at least a threshold period of time. If at least the threshold number of measured values are within the range of acceptable values for at least the threshold period of time (or whichever other criteria are satisfied indicating that a potentially dangerous situation for the health of the human in the enclosed compartment is not currently present), then additional monitoring of the enclosed compartment of the vehicle may be performed to capture additional sensor data including additional measured values of the health parameter.

In some example embodiments, the analysis of the sensor data indicative of characteristics of at least one of the interior or the surrounding exterior area of the vehicle may influence which automated vehicle response measure is taken. For instance, as long as the human in the enclosed compartment is determined not to be in a potentially dangerous health situation, if the sensor data indicative of environmental characteristics indicates that a potentially dangerous situation may be present outside of the enclosed compartment of the vehicle (e.g., in another interior area of the vehicle or in a surrounding exterior area of the vehicle), the automated vehicle response measure that is initiated may be to continue monitoring sensor data corresponding to the enclosed compartment of the vehicle and sensor data corresponding to the interior and/or surrounding exterior of the vehicle. In some example embodiments, a silent alert may be sent to one or more emergency service providers. In other example embodiments, if, for example, the sensor data relating to the enclosed compartment of the vehicle indicates a potentially dangerous health situation for the human entrapped in the enclosed compartment, various other automated vehicle response measures may be taken such as, for example, automatically navigating the vehicle to an emergency service provider location (e.g., a police station, fire station, etc.); outputting an audible signal/sound/alarm above a threshold decibel level to potentially mitigate a dangerous situation occurring inside or around the vehicle; automatically releasing a lock on the enclosed compartment; or the like.

Example embodiments of the invention provide technical solutions to technical problems presented by the absence of a human driver in autonomous vehicle contexts. In particular, example embodiments of the invention solve technical problems relating to the absence of a human driver in an autonomous vehicle by providing automated vehicle mechanisms for detecting the presence of a living being in an enclosed compartment of an autonomous vehicle based on an analysis of various types of sensor data; detecting a type of living being present in the enclosed compartment; and identifying and initiating one or more automated vehicle response measures based on the type of living being, and potentially, other sensor data indicative of environmental characteristics relating to an interior and/or surrounding exterior environment of the vehicle. These technical solutions provide an autonomous vehicle with the capability to address potentially dangerous conditions/situations that may result from or result in a living entity being present in an enclosed compartment of the vehicle in the absence of a human vehicle operator, and thus, constitute improvements to vehicle technology, and more specifically, autonomous vehicle technology.

Illustrative Embodiments

Various illustrative embodiments of the invention will now be described in connection with the various Figures. Referring first to FIG. 1, a vehicle 102 is depicted. The vehicle 102 may be a fully autonomous vehicle capable of fully autonomous operation; a semi-autonomous vehicle capable of performing some but not all vehicle operations autonomously; or the like. In those example embodiments in which the vehicle 102 is a fully autonomous vehicle, no human driver may be present in the vehicle 102. The vehicle 102 may be any suitable type of vehicle including, without limitation, a car; a truck; a vehicle with more than two axles; an armored vehicle; a two-wheeled vehicle; a three-wheeled vehicle; or the like.

One or more vehicle occupants 104 are illustratively depicted as being present in the vehicle 102. In some example embodiments, multiple occupants 104 may be present in the vehicle 102. In other example embodiments, a single occupant 104 may be present in the vehicle 102. In some example embodiments, the vehicle 102 may be an autonomous vehicle operated as part of a ride-sharing or taxi service (e.g., a robo-taxi). Various occupants 104 may enter and exit the vehicle at different times, and in some cases, multiple occupants 104 may share the vehicle 102 as they are transported to their respective destinations.

In example embodiments, a vehicle occupant 104 may enter the vehicle 102 along with one or more objects in the occupant's possession. In some example embodiments, a vehicle occupant 102 may place an item in her possession in a cargo area of the vehicle 102, which may be any enclosed space within the vehicle 102. In example embodiments, the object placed in the cargo area of the vehicle 102 may be, for example, a living being 112 such as an animal. The living being 112 may be, for example, a pet belonging to an occupant 104 of the vehicle 102. In some example embodiments, the pet may be housed in a container that is suitable for transporting live animals. For instance, the container may be ventilated to ensure that the pet receives a suitable amount of air while being transported in the container. In other example embodiments, the living being 112 may be a human. For instance, in some example embodiments, a human may be forced into the cargo area against his/her will. In other example scenarios, an individual may voluntarily enter the cargo area to, for example, evade capture or escape a dangerous situation or individual. While example embodiments of the invention may be described with respect to monitoring of a cargo area, it should be appreciated that such example embodiments are applicable to any enclosed region of the vehicle 102.

An illustrative cargo area of the vehicle 102 is depicted in FIG. 1 as including multiple cameras 106. The cameras 106 may be positioned/located so as to cumulatively provide a substantially complete field-of-view (FOV) of the cargo area. While two camera 106 are illustratively shown, it should be appreciated that any number of cameras 106 may be provided. In some example embodiments, one or more of the cameras 106 may be adapted to rotate, move axially, or the like within the cargo area so as to obtain image data from different vantage points. In example embodiments, the cameras 106 may be configured to capture a continuous stream of video data of the cargo area. In other example embodiments, the cameras 106 may be configured to capture images at specified times and/or at a designated frame capture rate.

In example embodiments, a light source 110 may be provided as well in the cargo area. The light source 110 may be continuously illuminated if, for example, the cameras 106 capture a continuous stream of video data, or may be periodically switched on at specified times or in accordance with a specified frame capture rate of the cameras 106. In addition, the cargo area may include one or more additional types of sensors 108. The sensor(s) 108 may include, without limitation, a moisture sensor adapted to detect water/moisture/humidity levels inside the cargo area; a gas concentration sensor adapted to detect the concentrations/levels of various types gases such as carbon dioxide, carbon monoxide, oxygen, or the like; an IR sensor adapted to capture heat signature data; a smoke sensor; a heat sensor; and so forth. These additional sensor(s) 108 may capture sensor data continuously or at periodic intervals. In some example embodiments, the various types of sensor data captured by these additional sensors 108 may include measured values of various health-related parameters, which can be analyzed in relation to expected ranges of values for such parameters to determine whether conditions within the cargo area are safe for the living being 112 present in the cargo area or present a potential health danger to the living being 112. Further, in some example embodiments, the sensor data generated by these additional sensors 108 may be used to supplement the image data (or as an alternative to image data that has a poor quality/resolution) to detect the presence of a living being in the enclosed compartment.

Figure 2:
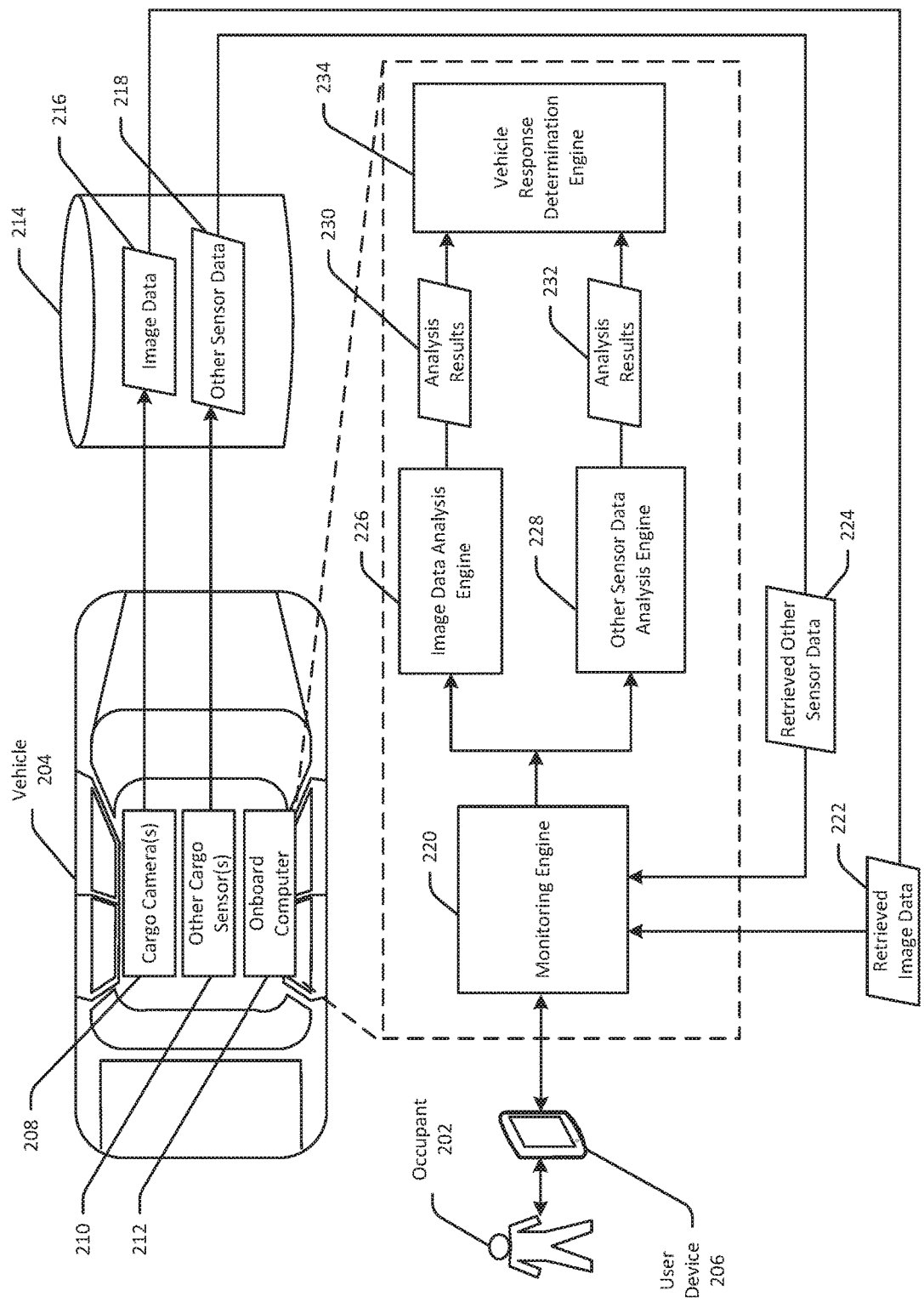
FIG. 2 is a data flow and block diagram illustrating a process for detecting a living being in an enclosed compartment of a vehicle such as a cargo area and initiating one or more automated vehicle response measures in response thereto in accordance with an example embodiment of the invention.
Figure 3:
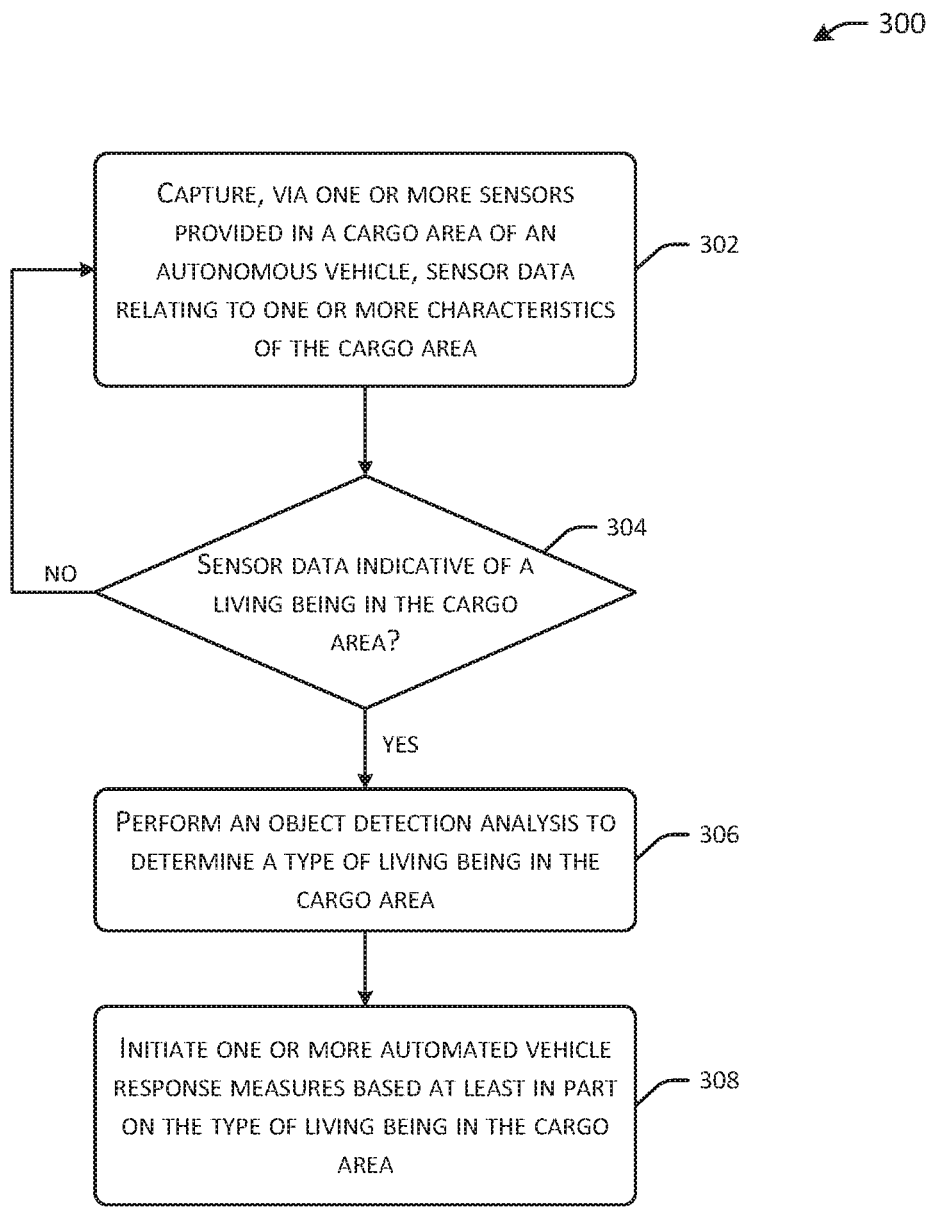
FIG. 3 is a process flow diagram of an illustrative method for capturing and analyzing sensor data to determine if a living being is present in an enclosed compartment of a vehicle such as a cargo area and initiating one or more automated vehicle response measures based on the type of living being that is detected in accordance with an example embodiment of the invention.

FIG. 2 is a data flow and block diagram illustrating a process for detecting one or more objects in a cargo area of a vehicle and initiating one or more automated vehicle response measures based on the detected object(s) in accordance with an example embodiment of the invention. FIG. 3 is a process flow diagram of an illustrative method 300 for detecting one or more objects in a cargo area of a vehicle and initiating one or more automated vehicle response measures based on the detected object(s) in accordance with an example embodiment of the invention. FIGS. 2 and 3 will be described in conjunction with one another hereinafter.

Each operation of any of the methods 300, 400, and/or 500 (which will be described later in this disclosure) can be performed by one or more of the engines/program modules depicted in FIG. 1 or 6, whose operation will be described in more detail hereinafter. These engines/program modules can be implemented in any combination of hardware, software, and/or firmware. While operations may be described as being performed by an engine or program module, it should be appreciated that such operations may be performed responsive to execution of software, firmware, and/or hardware of the engine or program module. For instance, in certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2, in example embodiments, a vehicle 204 is depicted. The vehicle 204 may be, for example, an illustrative configuration/implementation of the vehicle 102 depicted in FIG. 1. Also depicted in FIG. 2, is an occupant 202 of the vehicle 204. The occupant 202 may be, for example, one of the vehicle occupant(s) 104 depicted in FIG. 1. In some example embodiments, the vehicle occupant 202 may utilize a user device 206 which may include any suitable mobile device such as a smartphone, tablet, wearable device, or the like. The user device 206 may be configured to communicate over one or more cellular networks (e.g., a 4G Long-Term Evolution (LTE) network) and/or one or more local or wide area wireless networks (e.g., an 802.11 wireless communication network). The occupant 202 may utilize the user device 206 to, for example, communicate with the vehicle 204 such as in those example embodiments in which the vehicle 204 is an autonomous vehicle. For instance, the occupant 202 may receive alerts, messages, notifications, etc. from the autonomous vehicle 204 on the user device 206 and may communicate information to the autonomous vehicle 204 via the user device 206 (e.g., via a mobile application executing on the user device 206.

In example embodiments, the vehicle 204 may include cameras 208 located within a cargo area of the vehicle 204. In example embodiments, the cameras 208 may correspond to the cameras 106 of vehicle 102. The cameras 208 may be positioned/located within the cargo area of the vehicle 204 so as to cumulatively provide a substantially complete FOV of the cargo area. In some example embodiments, one or more of the cameras 208 may be adapted to rotate, move axially, or the like within the cargo area so as to obtain image data from different vantage points. In example embodiments, the cameras 208 may be configured to capture a continuous stream of video data of the cargo area. In other example embodiments, the cameras 208 may be configured to capture images at specified times and/or at a designated frame capture rate.

In example embodiments, the vehicle 204 may further include other cargo sensors 210. In some example embodiments, the other cargo sensors 210 may include any of the types of sensors previously described with respect to the sensors 108 depicted in FIG. 1 including, without limitation, a moisture sensor adapted to detect water/moisture/humidity levels inside the cargo area of the vehicle 204; a gas concentration sensor adapted to detect the concentrations/levels of various types gases such as carbon dioxide, carbon monoxide, oxygen, or the like inside the cargo area; an IR sensor adapted to capture heat signature data of an entity present in the cargo area; a smoke sensor adapted to detect smoke present in the cargo area; and so forth. These additional sensor(s) 210 may capture sensor data continuously or at periodic intervals. In some example embodiments, the various types of sensor data captured by these additional sensors 210 may include measured values of various health-related parameters, which can be analyzed in relation to expected ranges of values for such parameters to determine whether conditions within the cargo area are safe for a living being (e.g., the living being 112) present in the cargo area or present a potential health danger to the living being. Further, in some example embodiments, the sensor data generated by these additional sensors 210 may be used to supplement image data generated by the cargo cameras 208 (or as an alternative to image data that has a poor quality/resolution) to detect the presence of a living being in the cargo area.

In example embodiments, the vehicle 204 may be equipped with an onboard computer 212 (e.g., an electronic control unit of the vehicle 204 or other computing device integrated with the vehicle 204) that is configured to perform various processing relating to example embodiments of the invention via one or more processing engines. In particular, the onboard computer 212 may be configured to execute a monitoring engine 220, an image data analysis engine 226, an other sensor data analysis engine 228, and a vehicle response determination engine 234. These various engines may include any respective combination of software, firmware, and/or hardware configured to perform corresponding operations. While the computing device 212 is described herein as an onboard computer, it should be appreciated that some or all of the processing described as being performed by the onboard computer 212 may instead be performed in a remote environment (e.g., a cloud environment), and results of the processing may be communicated to the onboard computer 212.

Referring now to FIG. 2 in conjunction with FIG. 3, at block 302 of the method 300, sensor data relating to one or more characteristics of a cargo area (or other enclosed compartment) of the vehicle 204 may be captured by one or more sensors provided in the cargo area. For example, image data of the cargo area of the vehicle 204 may be captured by the cargo cameras 208. The captured image data may be stored as image data 216 in one or more datastores 214. The datastore(s) 214 may reside in local storage of the vehicle 204 or may reside in storage that is remote from the vehicle 204, but which is accessible by the onboard computer 212 via one or more communication networks. The sensor data captured at block 302 of the method 300 may further include data captured by the other cargo sensors 210 present in the cargo area of the vehicle 204. As previously noted, such other sensor data may include, without limitation, heat signature data; gas concentration data; moisture/humidity/water level data; and so forth. Sensor data generated by the other cargo sensors 212 may be stored as other sensor data 218 in the datastore(s) 214.

Referring again to FIG. 3 in conjunction with FIG. 2, at block 304 of the method 300, machine-readable/computer-executable instructions of the monitoring engine 220, the image data analysis engine 226, and/or the other sensor data analysis engine 228 may be executed to determine whether the sensor data captured at block 302 is indicative of a living being present in the cargo area (or other enclosed compartment) of the vehicle 204. In some example embodiments, the monitoring engine 220 may retrieve at least a portion of the stored image data 216 as retrieved image data 222. In some example embodiments, the monitoring engine 220 may relay the retrieved image data 222 to the image data analysis engine 226, which may perform an object detection analysis on the retrieved image data 222 using, for example, a trained machine learning model (e.g., a trained supervised, semi-supervised, or unsupervised classifier) to determine whether a living being is detectable in the image data 222, and thus, present in the cargo area (or other enclosed compartment) of the vehicle 204.

In some example embodiments, the monitoring engine 220 may retrieve at least a portion of the stored other sensor data 218 as retrieved other sensor data 224 (e.g., heat signature data, vibrational/movement data, gas sensor data, etc.) to supplement the object detection analysis performed on the retrieved image data 222 (or as an alternative to the image data 222 if it has a poor quality/resolution) to detect the presence of a living being in the cargo area of the vehicle 204. For instance, the monitoring engine 220 may retrieve the other sensor data 224 and relay the other sensor data 224 to the other sensor data analysis engine 228, which may determine whether the heat signature data is indicative of a heat signature characteristic of a living being. For example, if a living being is present in the cargo area, the heat signature data may reflect a greater amount of heat within the cargo area for a more extended period of time than would be the case if no living being is present in the cargo area. As another non-limiting example, the other sensor data analysis engine 228 may determine that a living being is present in the cargo area if the oxygen levels in the cargo area become depleted (or carbon dioxide levels increase) at rates that are above certain threshold values, and potentially, over at least a threshold period of time. As yet another non-limiting example, the other sensor data analysis engine 228 may determine that a living being is present in the cargo area if vibrational/movement data indicates at least a threshold amount of vibration/movement over, potentially, at least a threshold period of time.

If it is determined that no living being is present in the cargo area of the vehicle 204 based on the analysis of the retrieved image data 222 and/or the retrieved other sensor data 224 (a negative determination at block 304), the method 300 may proceed again to block 302, where additional image data and other sensor data relating to characteristics of the cargo area of the vehicle 204 may be captured over time. On the other hand, if it is determined that a living being is present in the cargo area of the vehicle 204 (a positive determination at block 304), the method 300 may proceed to block 306, where a further object detection analysis may be performed to determine a type of the living being present in the cargo area of the vehicle 204. Then, at block 308 of the method 300, the vehicle response determination engine 234 may initiate one or more automated vehicle response measures based at least in part on the type of living being detected in the cargo area.

For instance, in some example embodiments, a living being detected in the cargo area (or other enclosed compartment) of the vehicle 204 may be an animal such as a pet that the occupant 202 is transporting. In such example embodiments, the image data analysis engine 226 may execute a machine learning model/algorithm, for example, on the retrieved image data 222 to identify the living being as an animal. In some example embodiments, the living being detected in the cargo area of the vehicle 204 may be a human. As used herein, the term animal excludes humans. For example, in some situations, an individual may be forced into the enclosed compartment against their will. In other example scenarios, an individual may voluntarily enter the enclosed compartment to, for example, evade capture or escape a dangerous situation or individual. In some example embodiments, the image data analysis engine 226 may perform an object detection analysis, at block 306, on the retrieved image data 222 to determine that the living being detected in the cargo area of the vehicle 204 is a human. For instance, the image data analysis engine 226 may execute a trained machine learning model (e.g., a trained classifier) that receives the image data 222 as input and provides an output indicative of whether the living being depicted in the image data 222 is a human.

In some example embodiments, as a supplement or alternative to the object detection analysis performed by the image data analysis engine 226, the other sensor data analysis engine 228 may analyze the other sensor data 224 (e.g., heat signature data, vibrational/movement data, gas sensor data, etc.) to determine whether the living being present in the cargo area of the vehicle 204 is an animal or human. For instance, particular heat signatures, vibrational characteristics, and/or gas concentration levels may be characteristic of a human or an animal. The results of the object detection analysis performed by the image data analysis engine 226 may be provided as analysis results 230 to the vehicle response determination engine 234. Similarly, the results of the analysis performed by the other sensor data analysis engine 228 may be provided as analysis results 232 to the vehicle response determination engine 234.

At block 308 of the method 300, the vehicle response determination engine 234 may initiate one or more automated vehicle response measures based on the analysis results 230 and/or the analysis results 232. For example, if the analysis results 230 and/or the analysis results 232 indicate that the living being present in the cargo area of the vehicle 204 is an animal, the vehicle response determination engine 232 may initiate one or more automated vehicle response measures based on monitoring data indicative of a health status of the animal. If a potentially dangerous health situation is detected for the animal, such measures may include, without limitation, sending an emergency alert message to one or more emergency service providers; presenting a visual or audible alert to the occupant 202 via the user device 206 or an output device of the vehicle 204; automatically releasing a locking mechanism of the cargo area when the vehicle 204 is not moving; or the like. These measures and the conditions under which they may be taken will be described in more detail in reference to FIG. 4. An alternative set of automated vehicle response measures may be taken in those example scenarios in which the living being detected in the cargo area is a human. Such measures and the conditions under which they may be taken will be described in more detail in reference to FIG. 5.

Figure 4:
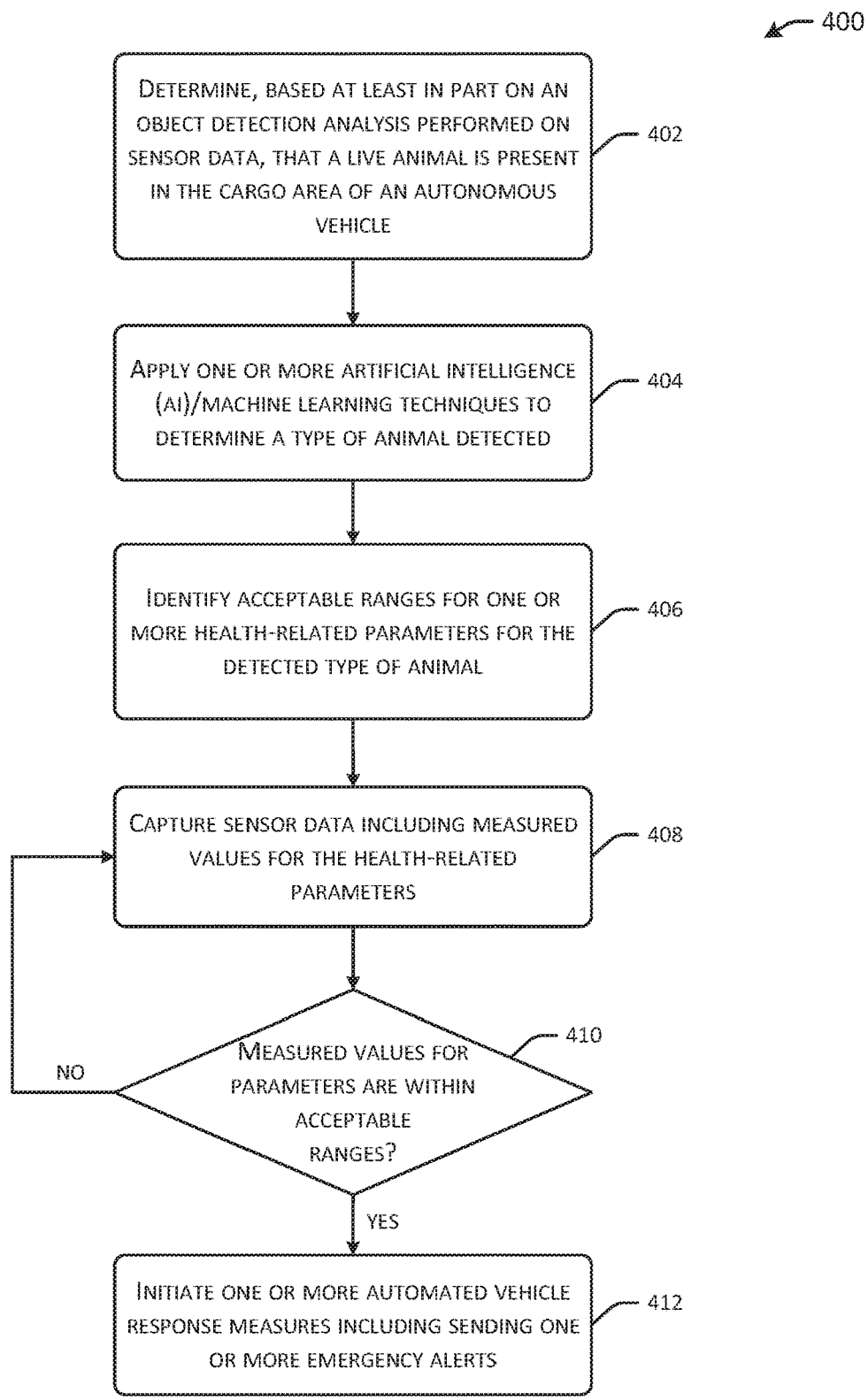
FIG. 4 is a process flow diagram of an illustrative method for capturing sensor data relating to a health parameter associated with a detected animal present in an enclosed compartment of a vehicle such as a cargo area and comparing the sensor data to a range of acceptable values for the health parameter to determine whether one or more automated vehicle response measures should be initiated in accordance with an example embodiment of the invention.
Figure 5:
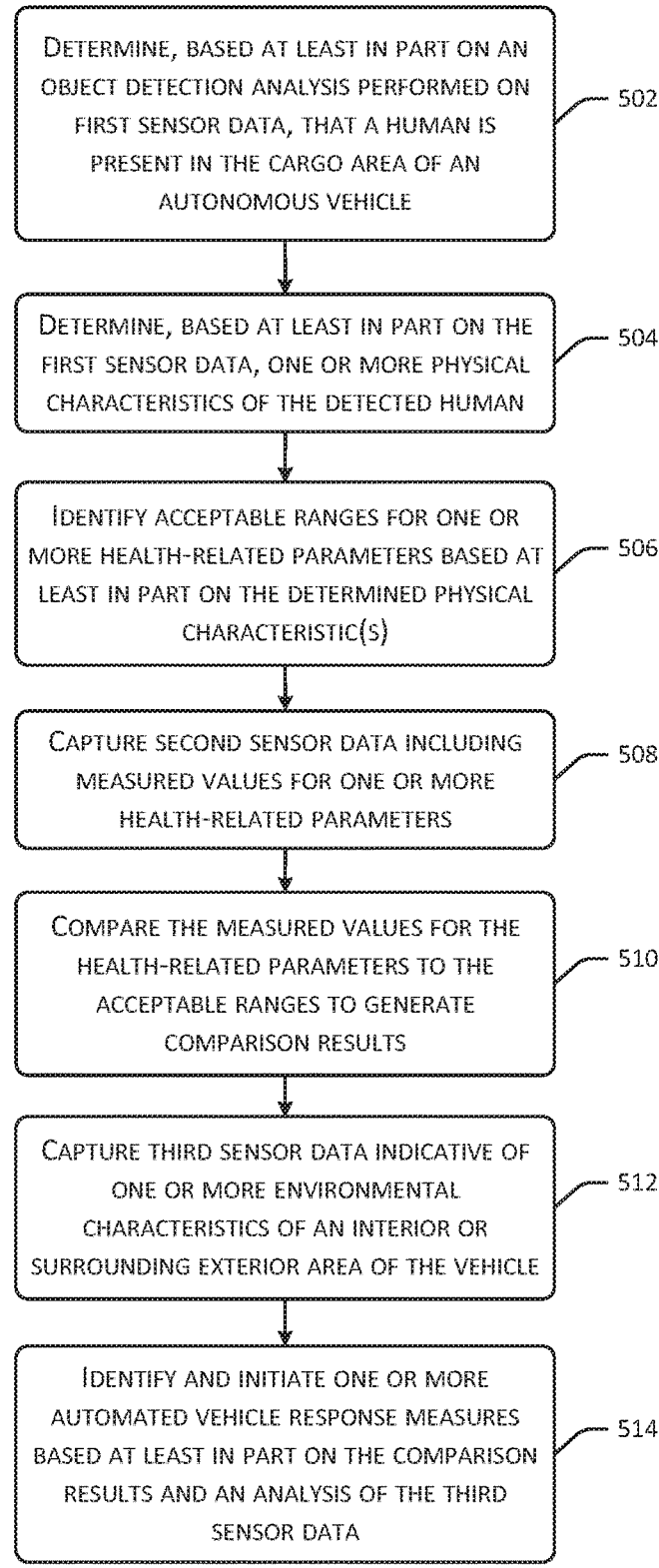
FIG. 5 is a process flow diagram of an illustrative method for capturing sensor data relating to a health parameter associated with a detected human present in an enclosed compartment of a vehicle such as a cargo area, comparing the sensor data to a range of acceptable values for the health parameter to obtain a set of comparison results, capturing sensor data indicative of environmental characteristics of an interior or surrounding exterior environment of the vehicle, and determining whether one or more automated vehicle response measures should be initiated based on the comparison results and an analysis of the sensor data indicative of the environmental characteristics in accordance with an example embodiment of the invention.

FIGS. 4 and 5 will now be described in succession. While not explicitly mentioned as part of the description of FIGS. 4 and 5, it should be appreciated that the engines depicted in FIG. 2 may be executed on the types of data depicted in FIG. 2 to perform any of the operations described in reference to FIGS. 4 and 5. FIG. 4 relates to processing that may be performed when a live animal is detected in a cargo area of a vehicle such as the vehicle 204. FIG. 5 relates to processing that may be performed when a human is detected in a cargo area of a vehicle such as the vehicle 204.

Referring now to FIG. 4, at block 402 of the method 400, a determination may be made that a live animal is present in a cargo area of a vehicle such as an autonomous vehicle based at least in part on an object detection analysis performed on sensor data (e.g., image data) captured by one or more sensors located in the cargo area (or otherwise adapted to detect conditions present in the cargo area). The object detection analysis performed at block 402 may correspond, for example, to the operation(s) performed at block 306 of the method 300 of FIG. 3. In some example embodiments, as previously described in reference to FIG. 3, other types of sensor data may be analyzed to determine that a living being present in the cargo area of the vehicle is a live animal. For instance, heat signature data, gas concentration level data, or the like captured by sensors in the cargo area may be characteristic of a live animal.

At block 404 of the method 400, one or more artificial intelligence (AI)/machine-learning techniques may be employed to determine the type of animal detected in the cargo area of the vehicle. For instance, a trained machine learning model (e.g., a trained classifier capable of distinguishing between different types of animals), and utilizing supervised, semi-supervised, or unsupervised learning, may be executed on image data of the cargo area and/or other sensor data to determine a type of animal present in the cargo area. In some example embodiments, particular heat signatures, breathing rates, movements, or the like may be characteristic of a particular type of animal.

At block 406 of the method 400, ranges of acceptable (e.g. normal) values for one or more health parameters may be determined for the type of animal that is detected. For example, ranges of acceptable heart rates, breathing rates, or the like—which may differ for different animals—may be determined for the type of animal detected. In some example embodiments, these normal ranges for various health-related parameters may be identified based on pre-existing health guidelines that specify such ranges. In other example embodiments, the normal ranges of values may be learned using machine learning models that analyze sensor data of cargo areas of various vehicles captured over time. For example, sensor data that corresponds to periods of time when live animals are present in cargo areas of vehicles and their health condition is safe may be captured and provided as training data to a machine learning model that is configured to determine ranges of acceptable values for health parameters based on the training data.

Then, at block 408 of the method 400, additional sensor data representing measured values for the various health-related parameters being evaluated may be captured. This additional sensor data may include, for example, heat signature data; gas concentration data; breathing rate data (which in some cases may be derived from the gas concentration data; vibrational/movement data; and the like. At block 410 of the method 400, the measured values of the health parameters may be compared to the ranges of acceptable values to determine whether one or more automated vehicle response measures should be initiated at block 412 of the method 400.

More specifically, in some example embodiments, a positive determination may be made at block 410 if at least threshold number of the measured values for the health-related parameters fall outside corresponding acceptable ranges for at least a threshold period of time. In some other example embodiments, a positive determination may be made at block 410 if at least a threshold number of the measured values are more than a threshold amount outside of the corresponding acceptable ranges for at least a threshold period of time. In other example embodiments, other criteria may be evaluated or other conditions may need to be met in order for a positive determination to be made at block 410. A positive determination at block 410 may be indicative of a potentially dangerous high-risk situation for the animal (e.g., a serious health risk for the animal). In example embodiments, if criteria indicative of a potentially dangerous situation are satisfied (a positive determination at block 410), one or more automated vehicle response measures may be initiated at block 412. Such measures may include, for example, sending an emergency alert message to one or more emergency service providers; presenting a visual or audible alert to an occupant of the vehicle; automatically releasing a locking mechanism of the enclosed compartment when the vehicle is not moving; or the like. In some example embodiments, if the criteria indicative of a potentially dangerous situation for the animal in the cargo area is not satisfied (a negative determination at block 410), the method 400 may proceed from block 408, where sensor data indicative of measured values for the health parameters may continue to be received, and evaluated, at block 412, against the criteria periodically.

Referring now to FIG. 5, at block 502 of the method 500, a determination may be made that a human is present in a cargo area of a vehicle such as an autonomous vehicle based at least in part on an object detection analysis performed on sensor data (e.g., image data) captured by one or more sensors located in the cargo area (or otherwise adapted to detect conditions present in the cargo area). The object detection analysis performed at block 502 may correspond, for example, to the operation(s) performed at block 306 of the method 300 of FIG. 3. In some example embodiments, as previously described in reference to FIG. 3, other types of sensor data may be analyzed to determine that a living being present in the cargo area of the vehicle is a human. For instance, heat signature data, gas concentration level data, or the like captured by sensors in the cargo area may be characteristic of a human.

At block 504 of the method 500, captured first sensor data may be evaluated to determine physical characteristics of a human present in the cargo area of the vehicle. For instance, image data may be assessed to approximate size characteristics of the human such as height, weight, body frame, or the like. Other forms of sensor data such as heat signature data, gas concentration levels, or the like—which as noted earlier can be used to determine that a living being is a human—can also be used to identify specific characteristics of the human at block 504.

At block 506 of the method 500, ranges of acceptable (e.g. normal) values for one or more health parameters may be determined for the human based on the determined physical characteristics. For example, normal ranges for heart rate, breathing rate, or the like that are specific to a human having the identified physical characteristics may be determined. In some example embodiments, these normal ranges for various health-related parameters may be identified based on pre-existing health guidelines that specify such ranges. In other example embodiments, the normal ranges of values may be learned using machine learning models that analyze sensor data of cargo areas of various vehicles captured over time. For example, sensor data that corresponds to periods of time when humans are present in cargo areas of vehicles and their health condition is safe may be captured and provided as training data to a machine learning model that is configured to determine ranges of acceptable values for health parameters based on the training data.

Then, at block 508 of the method 500, second sensor data representing measured values for the various health-related parameters being evaluated may be captured. The second sensor data may include, for example, heat signature data; gas concentration data; breathing rate data (which in some cases may be derived from the gas concentration data; vibrational/movement data; and the like. At block 510 of the method 500, the measured values of the health parameters may be compared to the ranges of acceptable values to generate a set of comparison results. At block 512 of the method 500, third sensor data indicative of environmental characteristics of an interior or surrounding exterior area of the vehicle may be captured and analyzed to generate a set of one or more analysis results. The third sensor data may include, without limitation, image data of interior areas of the vehicle other than the cargo area, image data of a surrounding vicinity of the vehicle, or the like. As another non-limiting example, the third sensor data may include audio data indicative of audible characteristics both inside and in a surrounding exterior environment of the vehicle.

Then, in example embodiments, at block 514 of the method 500, one or more automated vehicle response measures may be initiated based at least in part on the set of one or more comparison results and the set of one or more analysis results. In some example embodiments, the set of comparison results may be assessed to determine whether at least a threshold number of the measured values are within the range of acceptable values for at least a threshold period of time. If at least the threshold number of measured values are within the range of acceptable values for at least the threshold period of time (or whichever other criteria are satisfied indicating that a potentially dangerous situation for the health of the human in the enclosed compartment is not currently present), then additional monitoring of the enclosed compartment of the vehicle may be performed to capture additional sensor data including additional measured values of the health parameter.

In some example embodiments, the analysis of the third sensor data indicative of characteristics of at least one of the interior or the surrounding exterior area of the vehicle may influence which automated vehicle response measure is taken. For instance, as long as the human in the enclosed compartment is determined not to be in a potentially dangerous health situation, if the sensor data indicative of environmental characteristics indicates that a potentially dangerous situation may be present outside of the enclosed compartment of the vehicle (e.g., in another interior area of the vehicle or in a surrounding exterior area of the vehicle), the automated vehicle response measure that is initiated may be to continue monitoring sensor data corresponding to the enclosed compartment of the vehicle and sensor data corresponding to the interior and/or surrounding exterior of the vehicle. In some example embodiments, a silent alert may be sent to one or more emergency service providers. In other example embodiments, if, for example, the sensor data relating to the cargo area of the vehicle indicates a potentially dangerous health situation for the human entrapped in the enclosed compartment, various other automated vehicle response measures may be taken such as, for example, automatically navigating the vehicle to an emergency service provider location (e.g., a police station, fire station, etc.); outputting an audible signal/sound/alarm above a threshold decibel level to potentially mitigate a dangerous situation occurring inside or around the vehicle; automatically releasing a lock on the enclosed compartment; or the like.

Hardware Implementation

Figure 6:
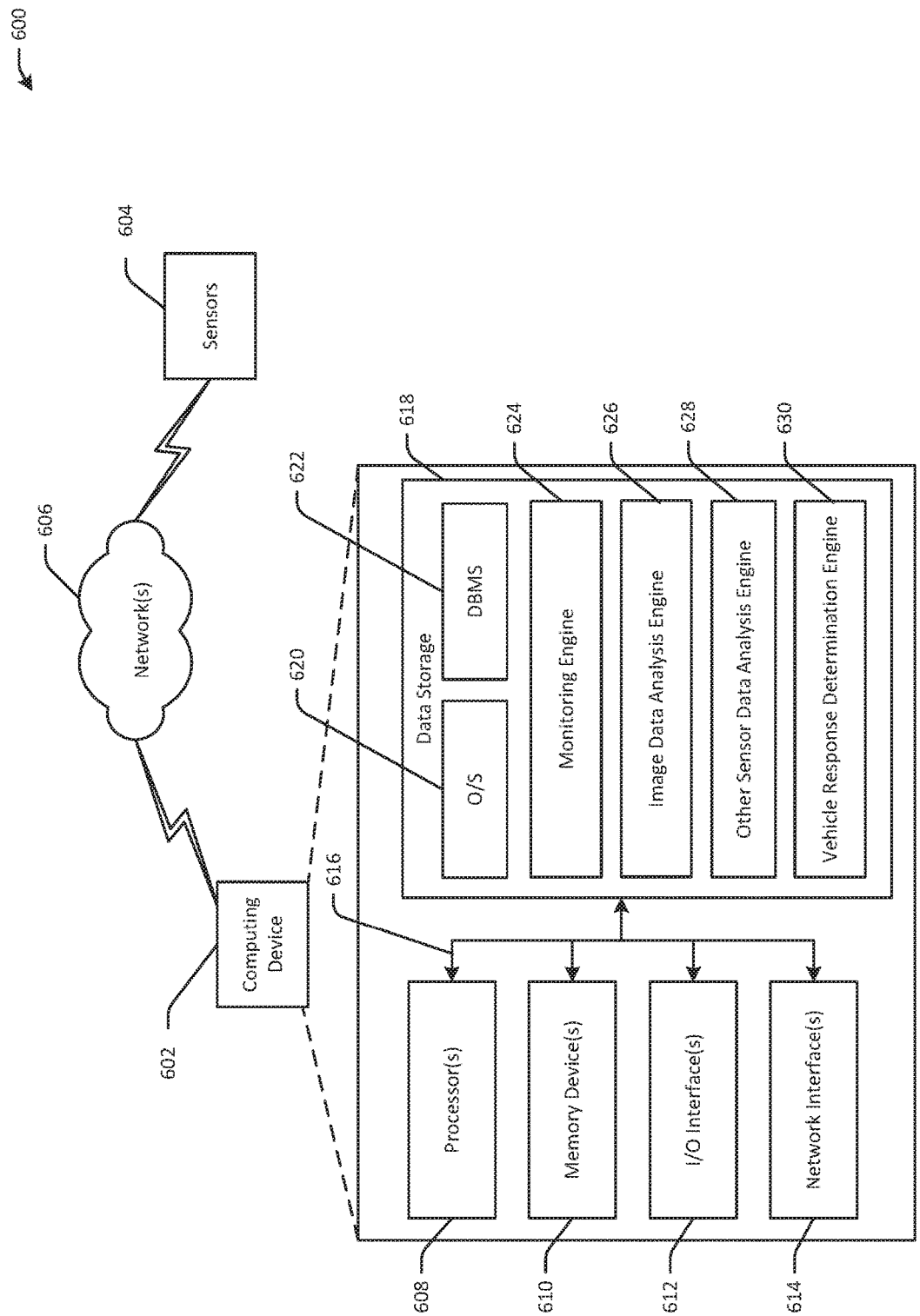
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. The sensors 604 may include any of a variety of types of on-board vehicle sensors that may be provided with an autonomous vehicle including, without limitation, Light Detecting and Ranging (LiDAR) sensors, radars, cameras, GPS receivers, sonar-based sensors, ultrasonic sensors, microphones, inertial measurement units (IMUs), accelerometers, gyroscopes, magnetometers, IR sensors, and so forth. In example embodiments, the sensors 604 may include on-board sensors provided on an exterior or in an interior of a vehicle (e.g., vehicle 102, vehicle 204) such as an autonomous vehicle. In example embodiments, the sensors 604 may include any of the sensors previously described (e.g., camera 106, sensors 108, cargo cameras 208, other cargo sensors 210). The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks.

The special-purpose computing device(s) 602 may be hard-wired to perform the techniques of example embodiments of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, various versions of the Windows operating system (e.g., Windows XP, Windows Vista, Windows 7, Windows 8, Windows Server, Windows CE, etc.), Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602 and/or the sensors 604 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. The data storage may store one or more engines, program modules, components, or the like including, without limitation, a monitoring engine 624, an image data analysis engine 626, an other sensor data analysis engine 628, and a vehicle response determination engine 630. Each of the engines/components depicted in FIG. 6 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines/components depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/components of the computing device 602. Such data may include, without limitation, image data, other sensor data, object type labeled data (e.g., training data for object detection algorithms), etc. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines/components of the computing device 602 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s) (not shown in FIG. 6). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 604 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 606 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 606, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 616. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for detecting presence of a living being in an enclosed compartment of a vehicle, the method comprising:
   capturing, via one or more sensors associated with the vehicle, sensor data relating to one or more sensed characteristics of the enclosed compartment of the vehicle, wherein the capturing comprises:

capturing, using a camera, one or more images within the enclosed compartment;

determining whether respective resolutions of the one or more images fail to satisfy a threshold resolution;

in response to determining that the respective resolutions of the one or more images fail to satisfy the threshold resolution, capturing any of:

heat signature data from one or more infrared (IR) sensors, vibrational data from one or more vibration or inertial sensors, and gas concentration data from one or more gas sensors;

determining that the sensor data is indicative of the presence of the living being in the enclosed compartment of the vehicle;

performing an object detection analysis on the one or more images included in the sensor data;

determining a type of the living being based at least in part on the object detection analysis;

determining a range of acceptable values of a health parameter related to the type of the living being;

capturing, via the one or more sensors, second sensor data including measured values of the health parameter;

determining whether the measured values of the health parameter are within the range of acceptable values;

performing additional monitoring of the enclosed compartment of the vehicle to capture additional sensor data including additional measured values of the health parameter further based at least in part on whether the measured values of the health parameter are within the range of acceptable values; and initiating one or more automated vehicle response measures based at least in part on the type of the living being.

2. The computer-implemented method of claim 1, wherein determining the type of the living being comprises determining that the living being is a live animal based at least in part on the object detection analysis.

3. The computer-implemented method of claim 2, further comprising applying a trained machine learning model to the image data to determine a type of the live animal.

4. The computer-implemented method of claim 3, wherein the sensor data is first sensor data,
wherein initiating the one or more automated vehicle response measures comprises initiating the one or more automated vehicle response measures further based at least in part on whether the measured values of the health parameter are within the range of acceptable values.

5. The computer-implemented method of claim 4, wherein determining whether the measured values of the health parameter are within the range of acceptable values comprises determining that each of a threshold number of the measured values of the health parameter is within the range of acceptable values for at least a threshold period of time.

6. The computer-implemented method of claim 4, wherein determining whether the measured values of the health parameter are within the range of acceptable values comprises determining that at least a threshold number of the measured values of the health parameter are outside of the range of acceptable values for at least a threshold period of time.

7. The computer-implemented method of claim 6, wherein initiating the one or more automated vehicle response measures comprises at least one of: i) sending an emergency alert message to one or more emergency service providers, ii) presenting a visual or audible alert to an occupant of the vehicle, or iii) automatically releasing a locking mechanism of the enclosed compartment when the vehicle is not moving.

8. The computer-implemented method of claim 1, wherein the sensor data is first sensor data, and wherein determining the type of the living being based at least in part on the object detection analysis comprises determining that the living being is a human, the method further comprising:

determining, based at least in part on the first sensor data, one or more physical characteristics of the human;

determining the range of the acceptable values for the health parameter based at least in part on the one or more physical characteristics of the human;

capturing, via the one or more sensors, second sensor data including measured values of the health parameter;

comparing the measured values of the health parameter to the range of acceptable values for the health parameter to obtain a set of one or more comparison results;

capturing, via the one or more sensors, third sensor data indicative of one or more environmental characteristics of at least one of an interior or surrounding exterior area of the vehicle; and analyzing the third sensor data to generate a set of one or more analysis results, wherein initiating the one or more automated vehicle response measures comprises initiating the one or more automated vehicle response measures further based at least in part on the set of one or more comparison results and the set of one or more analysis results.

9. The computer-implemented method of claim 8, wherein comparing the measured values of the health parameter to the range of acceptable values for the health parameter comprises determining that at least a threshold number of the measured values are within the range of acceptable values for at least a threshold period of time, wherein analyzing the third sensor data comprises determining that the third sensor data is indicative of a potentially dangerous condition present in at least one of the interior or the surrounding exterior area of the vehicle, and wherein initiating the one or more automated vehicle response measures comprises at least one of: i) performing additional monitoring of the enclosed compartment of the vehicle to capture first additional sensor data including additional measured values of the health parameter, ii) performing additional monitoring of at least one of the interior or the surrounding exterior area of the vehicle to capture second additional sensor data indicative of the one or more environmental characteristics, or iii) sending a silent alert to one or more emergency service providers.

10. A system for detecting presence of a living being in an enclosed compartment of a vehicle, the system comprising:

at least one processor; and at least one memory storing computer-executable instructions, wherein the at least one processor is configured to access the at least one memory and execute the computer-executable instructions to:

capture, via one or more sensors associated with the vehicle, sensor data relating to one or more sensed characteristics of the enclosed compartment of the vehicle, wherein the capturing comprises:

capturing, using a camera, one or more images within the enclosed compartment;

determining whether respective resolutions of the one or more images fail to satisfy a threshold resolution;

in response to determining that the respective resolutions of the one or more images fail to satisfy the threshold resolution, capturing any of:
heat signature data from one or more infrared (IR) sensors,
vibrational data from one or more vibration or inertial sensors, and
gas concentration data from one or more gas sensors;
determine that the sensor data is indicative of the presence of the living being in the enclosed compartment of the vehicle;
perform an object detection analysis on the one or more images image data included in the sensor data;
determine a type of the living being based at least in part on the object detection analysis;
determine a range of acceptable values of a health parameter related to the type of the living being;
capture, via the one or more sensors, second sensor data including measured values of the health parameter;
determine whether the measured values of the health parameter are within the range of acceptable values;
perform additional monitoring of the enclosed compartment of the vehicle to capture additional sensor data including additional measured values of the health parameter further based at least in part on whether the measured values of the health parameter are within the range of acceptable values; and
initiate one or more automated vehicle response measures based at least in part on the type of the living being.

11. The system of claim 10, wherein the at least one processor is configured to determine the type of the living being by executing the computer-executable instructions to determine that the living being is a live animal based at least in part on the object detection analysis.

12. The system of claim 11, wherein the at least one processor is further configured to execute the computer-executable instructions to apply a trained machine learning model to the image data to determine a type of the live animal.

13. The system of claim 12, wherein the sensor data is first sensor data, and
wherein the at least one processor is configured to initiate the one or more automated vehicle response measures by executing the computer-executable instructions to initiate the one or more automated vehicle response measures further based at least in part on whether the measured values of the health parameter are within the range of acceptable values.

14. The system of claim 13, wherein the at least one processor is configured to determine whether the measured values of the health parameter are within the range of acceptable values by executing the computer-executable instructions to determine that each of a threshold number of the measured values of the health parameter is within the range of acceptable values for at least a threshold period of time.

15. The system of claim 13, wherein the at least one processor is configured to determine whether the measured values of the health parameter are within the range of acceptable values by executing the computer-executable instructions to determine that at least a threshold number of the measured values of the health parameter are outside of the range of acceptable values for at least a threshold period of time.

16. The system of claim 15, wherein the at least one processor is configured to initiate the one or more automated vehicle response measures by executing the computer-executable instructions to at least one of: i) send an emergency alert message to one or more emergency service providers, ii) present a visual or audible alert to an occupant of the vehicle, or iii) automatically release a locking mechanism of the enclosed compartment when the vehicle is not moving.

17. The system of claim 10, wherein the sensor data is first sensor data, wherein the at least one processor is configured to determine the type of the living being by executing the computer-executable instructions to determine that the living being is a human based at least in part on the object detection analysis, and wherein the at least one processor is further configured to execute the computer-executable instructions to:
determine, based at least in part on the first sensor data, one or more physical characteristics of the human;
determine the range of the acceptable values for the health parameter based at least in part on the one or more physical characteristics of the human;
capture, via the one or more sensors, second sensor data including measured values of the health parameter;
compare the measured values of the health parameter to the range of acceptable values for the health parameter to obtain a set of one or more comparison results;
capture, via the one or more sensors, third sensor data indicative of one or more environmental characteristics of at least one of an interior or surrounding exterior area of the vehicle; and
analyze the third sensor data to generate a set of one or more analysis results,
wherein the at least one processor is configured to initiate the one or more automated vehicle response measures by executing the computer-executable instructions to initiate the one or more automated vehicle response measures further based at least in part on the set of one or more comparison results and the set of one or more analysis results.

18. The system of claim 17, wherein the at least one processor is configured to compare the measured values of the health parameter to the range of acceptable values for the health parameter by executing the computer-executable instructions to determine that at least a threshold number of the measured values are within the range of acceptable values for at least a threshold period of time, wherein the at least one processor is configured to analyze the third sensor data by executing the computer-executable instructions to determine that the third sensor data is indicative of a potentially dangerous condition present in at least one of the interior or the surrounding exterior area of the vehicle, and wherein the at least one processor is configured to initiate the one or more automated vehicle response measures by executing the computer-executable instructions to at least one of: i) perform additional monitoring of the enclosed compartment of the vehicle to capture first additional sensor data including additional measured values of the health parameter, ii) perform additional monitoring of at least one of the interior or the surrounding exterior area of the vehicle to capture second additional sensor data indicative of the one or more environmental characteristics, or iii) send a silent alert to one or more emergency service providers.

19. The computer-implemented method of claim 1, wherein the sensor data comprises the gas concentration data from the one or more gas sensors, and wherein the determining that the sensor data is indicative of the presence of the living being in the enclosed compartment of the vehicle is based on a determination of carbon dioxide levels in the enclosed compartment.

20. The computer-implemented method of claim 1, wherein the sensor data comprises the gas concentration data from the one or more gas sensors, and wherein the determining that the sensor data is indicative of the presence of the living being in the enclosed compartment of the vehicle is based on a determination of oxygen levels in the enclosed compartment.

* * * * *